Nov. 5, 1935.  A. MISCH  2,019,790
VALVE SEAT DRESSING DEVICE
Filed Feb. 12, 1934
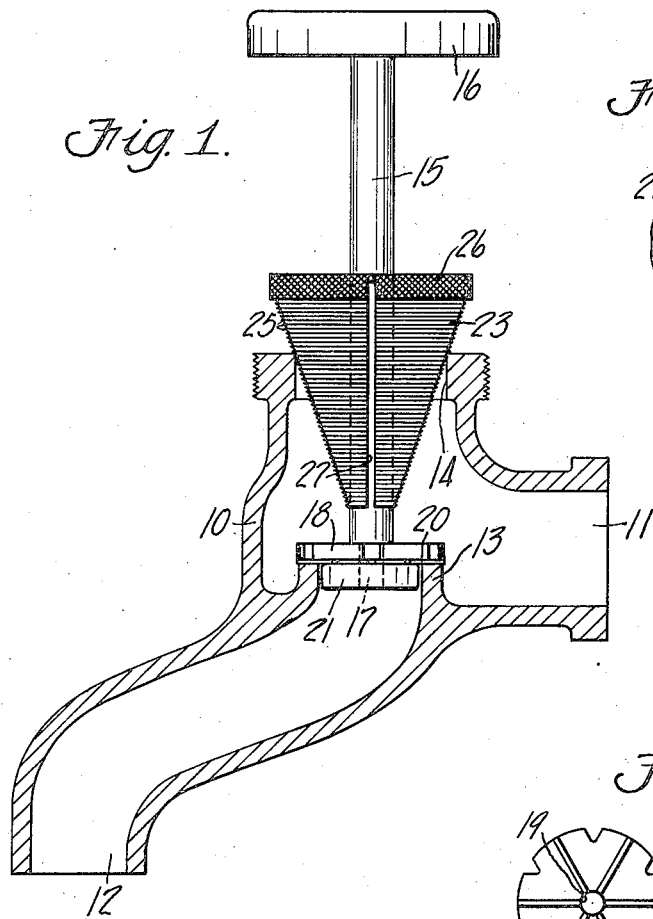
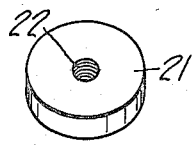
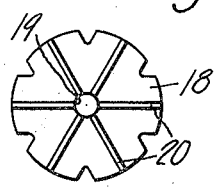
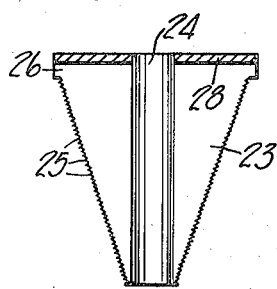
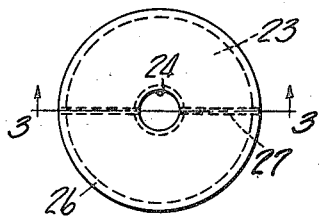
INVENTOR.
Arthur Misch.
BY
ATTORNEY.

Patented Nov. 5, 1935

2,019,790

UNITED STATES PATENT OFFICE 2,019,790

VALVE SEAT DRESSING DEVICE

Arthur Misch, South Bend, Ind., assignor to M. B. Skinner Co., South Bend, Ind.

Application February 12, 1934, Serial No. 710,869

1 Claim. (Cl. 90—12.5)

The invention relates to valve seat dressing devices, and particularly to devices of this character for dressing the valve seats of bibb-cocks or faucets.

The primary object of the invention resides in the provision of a device for dressing the seat of a bibb-cock or faucet with absolute accuracy, whereby all possibility of chatter of the dressing element in the rotation thereof, to produce an uneven seat facing due to failure to hold or journal the dresser operating stem in uniform unvarying position during the rotation of the stem is eliminated.

A further object is to provide, in a device of the character described, a bearing for the dresser operating stem which is slidable on the stem and of a form readily adapted to enter and fit varying sizes of faucet openings through which the stem passes, and which bearing is adapted to be firmly secured to the faucet body by a gripping action on the wall of said opening induced by a mere turning of the bearing.

A further object resides in the provision of a cone-shaped bearing for the cutter mounting stem adapted to center itself in the faucet opening through which the stem passes, and provided with fine screw threads adapted to cut or thread into the softer metal of the valve or faucet whereby to anchor itself by a mere manual turning of the bearing.

A further object resides in providing a device of this character with a bearing having an initial close fit with the cutter carrying stem and of a construction whereby movement imparted to the bearing to secure the same to the casing of a valve or faucet will tend to reduce the bore of the bearing and thus provide a perfect interfit between the bearing and the stem which will prevent the stem from moving laterally or wobbling in its operation.

A further object resides in providing a device of this character with a bearing for the cutter carrying stem which is of a yielding construction whereby, in the insertion of the bearing to place relative to the housing of the faucet or valve, the bearing engages the stem to grip it and thus prevent the longitudinal movement of the stem relative to the bearing which commonly results in chatter of the cutter and its stem and in uneven dressing of the face of the valve seat.

A further object is to provide a bearing member of conical shape and having a bore therethrough, which is provided with peripheral screw threads and with a longitudinal slit to provide complementary bearing parts interconnected by a flexible web portion, said bearing being adapted for secure engagement with any opening of a size between the size of the end portions of the bearing by means of said threads, the rotation of said bearing in said opening producing longitudinal movement of the bearing with resultant urging of said complementary parts in the direction of each other to reduce the size of the bearing bore.

With the above and other objects, in view, the invention resides in the construction, combination and arrangement of parts, as hereinafter set forth, shown in the drawing, described and claimed, it being understood that changes in the precise embodiment of the invention may be made within the scope of what is claimed without departing from the spirit of the invention.

In the drawing:

Figure 1 is a sectional view of a faucet illustrating, in side elevation, the valve seat dressing device disposed in operative relation thereto.

Figure 2 is a top plan view of the improved bearing of the device.

Figure 3 is a transverse sectional view of the bearing taken on line 3—3 of Figure 2.

Figure 4 is a bottom plan view of the dresser.

Figure 5 is a perspective view of another bearing employed in the device.

Referring to the drawing, which illustrates the preferred embodiment of the invention, the numeral 10 designates a conventional bibb-cock or faucet having an inlet 11, an outlet or spout 12, a valve seat 13 on which a valve member is adapted to seat, and an opening 14 in axial alignment with valve seat 13 and through which the stem of the valve is adapted to extend.

The valve seat dressing device is intended particularly for use in dressing the valve seat 13 of this type of cock or faucet, and comprises a stem 15 fixedly carrying a handle portion 16 at one end thereof. The opposite end 17 of stem 15 is of reduced diameter, and is screw threaded. A dresser member 18, provided with an internally screw threaded opening 19 disposed centrally thereof for threaded engagement with stem end 17, is formed in the general shape of a disc, and from one face thereof project a plurality of radially extending cutting or dressing ribs 20. A disc-shaped bearing 21, provided with an internally screw threaded central opening 22, is mounted on threaded end 17 of stem 15 outwardly of, but preferably in engagement with to provide a lock nut for, the dresser member 18.

A conical bearing 23, having a longitudinal central bore 24, is shiftably carried by stem 15 between handle 16 and dresser 18, the reduced diameter end of said bearing 23 being downwardly disposed or directed toward dresser 18. Bearing 23 is provided with a plurality of fine screw threads 25 in its periphery throughout the extent of its length. An enlarged, knurled, hand gripping portion 26 is formed at the upper large-diameter end of said bearing. A longitudinally extending, transverse, central slot or kerf 27 is formed in and extends transversely through the conical bearing 23, said slot 27 extending from the small-diameter end thereof to and into the knurled part 26, whereby the conical threaded portion of said bearing is formed of complementary sections interconnected by thin flexible integral webs 28 of the knurled part 26. It will be noted that the interconnected sections are rigid and by being connected at their upper ends by the flexible integral webs 28, that when the conical bearing 23 is threaded into the valve casing opening 14 their lower ends will uniformly move inwardly, particularly at their lower end into gripping engagement with the stem 15 so that said stem will be held positively in axial relation to the valve seat and the opening 14, which would not be the case if these interconnected sections were flexible.

In the use of the device, the valve having first been removed from the cock or faucet, the stem 15 carrying dresser 18 and bearing 21 is inserted through opening 14 of the faucet to position said dresser 18 on and concentric of valve seat 13, the bearing 21 passing through and fitting closely in the valve opening below the valve seat. Bearing 23 is then shifted longitudinally on stem 15 into faucet opening 14, and is then pressed downwardly and rotated on said stem, the threads 25 thereof biting into the softer metal of the faucet which forms the walls of opening 14 upon said rotation and thereby assuming a securely maintained centered portion in said opening 14. Furthermore, by the rotation of bearing 23, the complementary sections of the conical portion thereof are inwardly urged to reduce the spacing of said sections and the transverse dimension of bearing bore 24 to engage stem 15 and eliminate lateral play thereof in said bearing. It will be understood, of course, that the extent of the rotation of the bearing 23 is to be limited to prevent a gripping action of said bearing parts on said stem and permit rotation of said stem in said bearing. The bearing 23, together with bearing 21, thus serves to position stem 15 in true centrally disposed perpendicular relation to valve seat 13; whereby the dresser 18, upon its rotation by stem 15, will properly and truly dress said valve seat, and all possibility of chatter of the stem 15 in bearing 23 which would result in nicking of said valve seat, or of improper angular positioning of said stem relative to said valve seat which would result in improper dressing thereof, being thus eliminated by reason of the firmness and accuracy with which the stem 15 is held and positioned relative to the valve seat. It will also be seen that, by virtue of the conical shape of bearing 23, the dressing device may be used upon faucets of a wide variety of sizes with equal facility, the bearing 23 serving its function on all faucets whose openings 14 are of a size within the limits of the dimensions of said bearing. The chatter to which the cutter stem is subject in its operation is generally longitudinal as well as lateral, as upon engagement of the cutter with an uneven valve face, and the bearing 23, by its gripping action upon stem 15, serves to prevent this longitudinal stem chatter or vibration, and thus eliminates possibility of chatter of the stem in any manner.

The invention having been set forth, what is claimed as new and useful is:

A screw threaded conical bearing adapted to fit into an opening of a member, a cylindrical portion at the upper end of said bearing, said bearing having an axial bore extending entirely through the same and longitudinal slits formed therein and extending from the apex end thereof to a point adjacent the other end thereof, said slits providing complementary rigid stem gripping arms, said slits extending a substantial distance into the cylindrical portion and thereby forming relatively thin flexible webs connecting the complementary members in a manner whereby the apex end of the complementary members may move into a positive gripping action on the stem within the bore and the complementary members will not flex upon side pressure during the rotation of the stem within the bore.

ARTHUR MISCH.